United States Patent
Bhogal et al.

(10) Patent No.: US 8,189,756 B2
(45) Date of Patent: May 29, 2012

(54) TELEPHONE MENU SELECTION

(75) Inventors: Kulvir S. Bhogal, Forth Worth, TX (US); Robert Peterson, Austin, TX (US); Lisa Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 11/968,434

(22) Filed: Jan. 2, 2008

(65) Prior Publication Data

US 2009/0172027 A1 Jul. 2, 2009

(51) Int. Cl.
*H04M 3/42* (2006.01)
(52) U.S. Cl. .................. 379/201.12; 379/88.18
(58) Field of Classification Search .......... 379/67.1, 379/88.23, 355.01, 88.01; 713/202
See application file for complete search history.

(56) References Cited

U.S. PATENT DOCUMENTS

| | | | |
|---|---|---|---|
| 5,243,643 A * | 9/1993 | Sattar et al. | 379/88.23 |
| 5,488,650 A | 1/1996 | Greco et al. | |
| 5,864,605 A * | 1/1999 | Keshav | 379/88.01 |
| 5,946,377 A | 8/1999 | Wolf | |
| 6,629,246 B1 * | 9/2003 | Gadi | 726/8 |
| 7,062,544 B1 | 6/2006 | Ollis | |
| 7,065,188 B1 * | 6/2006 | Mei et al. | 379/88.23 |
| 2007/0041569 A1 * | 2/2007 | Chang | 379/355.01 |

OTHER PUBLICATIONS

Zeitzer, Nicole, "12 ways to get out of recorded-message hell and get a live customer service rep." found at http://money.cnn.com/2003/10/30/pf/smart_assets/index.htm, three pages.

* cited by examiner

*Primary Examiner* — Simon Sing
*Assistant Examiner* — Van D Huynh
(74) *Attorney, Agent, or Firm* — Mollborn Patents, Inc.; Fredrik Mollborn

(57) ABSTRACT

A method and system for facilitating user selection of telephone menu options. In one embodiment, the method includes receiving at least one function and a corresponding correspondent-defined code, wherein the correspondent-defined code identifies the at least one function. The method also includes receiving a user-defined code, where the user-defined code identifies the at least one function. The method also includes generating a mapping of the at least one function, the correspondent-defined code, and the user-defined code.

12 Claims, 4 Drawing Sheets

TELEPHONE MENU SELECTION

FIELD OF THE INVENTION

The present invention relates to telephone systems, and more particularly to touch tone-driven telephone menus.

BACKGROUND OF THE INVENTION

Touch tone-driven telephone menus are quite common in telephone systems. For example, when a user makes a call to someone and the call goes to a voicemail system, the user may need to press 1 to leave a voicemail. Unfortunately, the options of which numbers to press for certain functions are not universal across correspondents. For example, pressing 1 when calling a SprintPCS user will take you to their voicemail. However, pressing 1 when calling a Cingular user is not a valid option. To reach their voicemail, the user must dial a 2. This lack of congruity among touch tone options is also common when dealing with customer service numbers. For example, to reach a customer service representative with Circuit City's technical support, the user may have to dial a 3, compared to Best Buy's tech support, where it may be 5. Furthermore, these menu option are changed from time to time.

Accordingly, what is needed is an improved telephone menu system. The present invention addresses such a need.

SUMMARY OF THE INVENTION

A method and system for facilitating user selection of telephone menu options is disclosed. In one embodiment, the method includes receiving at least one function and a corresponding correspondent-defined code, wherein the correspondent-defined code identifies at least one function. The method also includes receiving a user-defined code, where the user-defined code identifies at least one function. The method also includes generating a mapping of at least one function, the correspondent-defined code, and the user-defined code. According to the method and system disclosed herein, the method and system enable a user to more conveniently select telephone menu options during a telephone call.

DETAILED DESCRIPTION OF THE INVENTION

The present invention relates to telephone systems, and more particularly to touch tone-driven telephone menus. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

A method and system in accordance with the present invention for facilitating user selection of telephone menu options are disclosed. The method includes receiving a set of functions that a user may select using corresponding correspondent-defined codes (e.g., touch tones) in a telephone menu during a telephone call to a correspondent. For example, a user may press a given touch tone series (e.g., *5) into the telephone key pad to select a given function (e.g., transfer to a live representative). The method also includes receiving one or more user-defined codes, where a given user-defined code (e.g., 0) identifies a respective function (e.g., transfer to a live representative). The method also includes generating a mapping of the at least one function, the correspondent-defined code, and the user-defined code. This method can be applied to different telephone menus of different correspondents. According to the method and system disclosed herein, the method and system enable a user to more conveniently select telephone menu options during a telephone call. For example, the user may enter the same user-defined code (e.g., 0) in order to select a given function (e.g., transfer to a live representative) for different correspondents.

As a result, the user conveniently uses a single set of codes for selecting telephone menu options for different correspondents. To more particularly describe the features of the present invention, refer now to the following description in conjunction with the accompanying figures.

Figure 1:
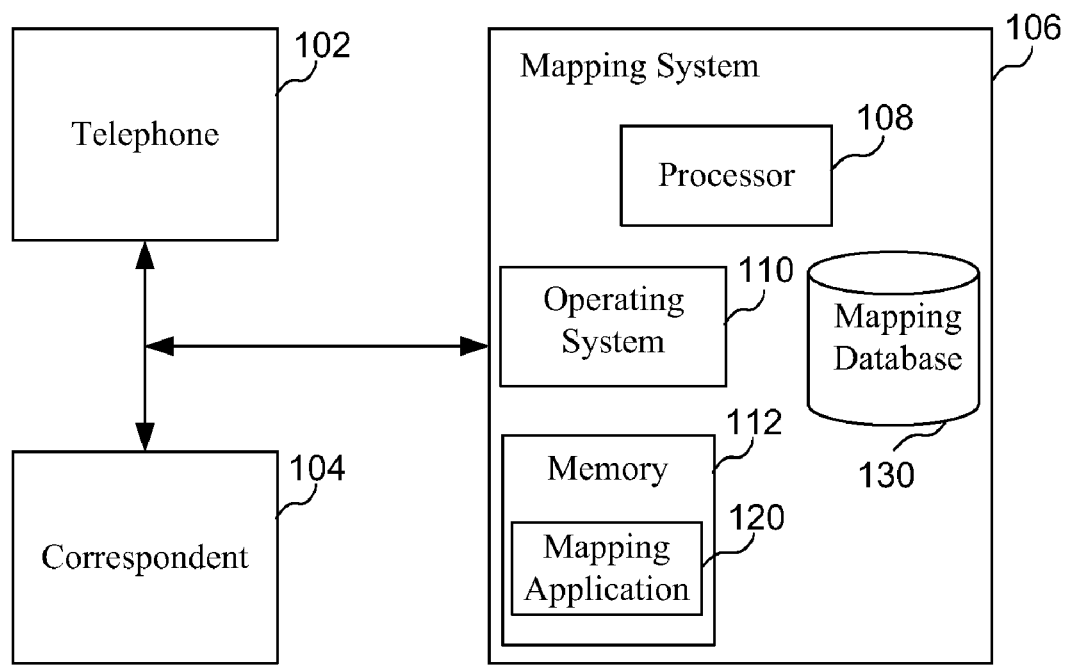
FIG. 1 is a block diagram of a telephone system in accordance with one embodiment of the present invention.

FIG. 1 is a block diagram of a telephone system 100 in accordance with one embodiment of the present invention. As FIG. 1 shows, the telephone system 100 includes a telephone 102, a correspondent 104, and a mapping system 106. The mapping system includes a processor 108, an operating system 110, a memory 112, a mapping application 120, and a mapping database 130. The mapping application 120 is stored on the memory 112 or may be stored on any other suitable storage location or computer-readable medium. The mapping application 120 provides instructions that enable the processor 102 to perform the functions described herein. In one embodiment, the mapping system 106 resides at a location that is separate from the telephone 102 (e.g., at a service provider). In another embodiment, the mapping system 106 may reside in the telephone 102.

Figure 2:
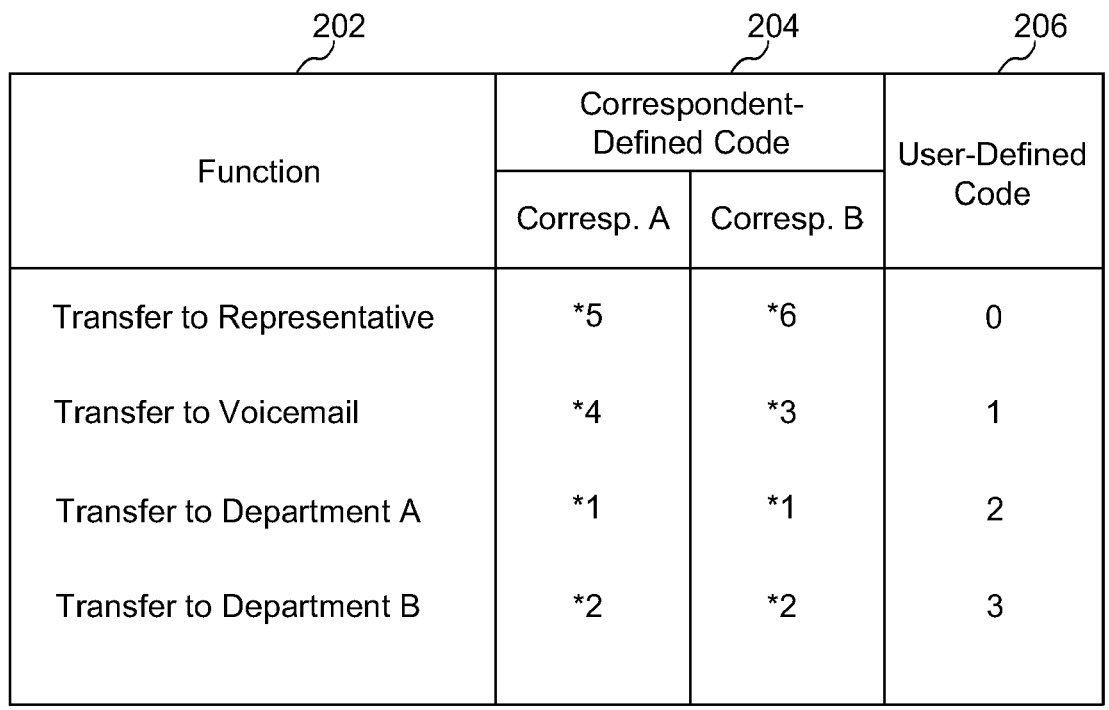
FIG. 2 is a table showing a mapping of functions, correspondent-defined codes, and user-defined codes in accordance with one embodiment of the present invention.

FIG. 2 is a table showing a mapping 200 of functions 202, correspondent-defined codes 204, and user-defined codes 206 in accordance with one embodiment of the present invention. The generation and implementation of the mapping is described in more detail below.

Figure 3:
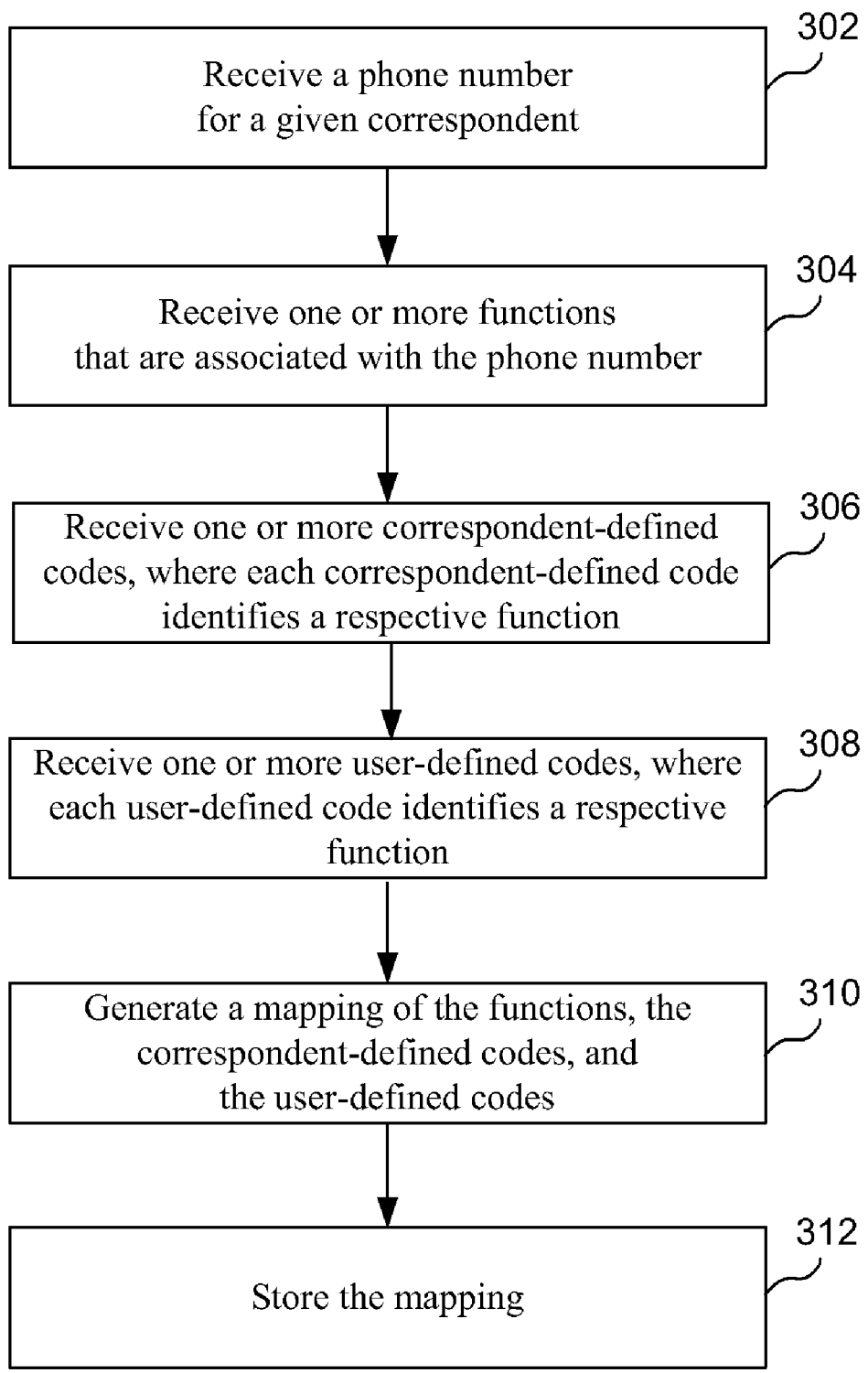
FIG. 3 is a flow chart showing a method for establishing a mapping of functions, correspondent-defined codes, and user-defined codes in accordance with one embodiment of the present invention.

FIG. 3 is a flow chart showing a method for establishing a mapping of functions, correspondent-defined codes, and user-defined codes in accordance with one embodiment of the present invention. Referring to FIGS. 1, 2, and 3 together, the process begins in step 302 where the mapping application 120 of the mapping system 106 receives a phone number for a given correspondent. Next, in step 304, the mapping application 120 receives one or more functions 202 of a telephone menu that are associated with the phone number. Next, in step 306, the mapping application 120 receives one or more correspondent-defined codes 204, where each correspondent-defined code 204 identifies a respective function. Next, in step 308, the mapping application 120 receives one or more user-defined codes 206, where each user-defined code 206 identifies a respective function 202. By providing the mapping application 120 with a user-defined code 206, the user defines which number they want to press for a given function during a phone call. Next, in step 310, the mapping application 120 generates a mapping of the functions 202, the correspondent-defined codes 204, and the user-defined codes 206. Next, in step 312, the mapping application 120 stores the mapping. In one embodiment, the mapping is stored in the mapping database 130 or may be stored on any other suitable storage location or computer-readable medium.

In one embodiment, the mapping application 120 automatically updates the mapping to reflect changes to the options and correspondent-defined codes of a given telephone menu. For example, if Correspondent A changes the correspondent-defined code (e.g., for transferring the user's call to a representative) from *5 to *6, the mapping application 130 can download the update for Correspondent A and automatically update the mapping to reflect the change. As such, the new mapping will be 0 to *6, where 0 is the user-defined code.

In one embodiment, the user can create a profile for a correspondent, where the profile includes one or more mappings for the correspondent. For example, the user may define a profile for Correspondent A (e.g., Bank of America) or a profile for all correspondents that use a particular correspondent (e.g., SprintPCS). The user can manually enter the mappings. For instance, the user can manually map *3 to a series of menu selections such as 3>2>0 to reach a customer service representative at Correspondent A. In one embodiment, the mapping application 120 automatically generates the profiles and corresponding mappings.

Embodiments also support integration with resources such as databases or online repositories so that mappings are performed automatically. Such online repositories are common now on the internet and may include, for example, websites, blogs, and articles that keep updated information on how to reach a customer service representative. This invention enables mappings in a given profile to be automatically updated from an online database.

In one embodiment, a simple XML/HTTP protocol can be used to periodically query a database or online resources for updates. An example of such an XML payload that contains the updated profile information follows:

```
<profile name="Bank of America">
    <key-map type="single-menu" input="*3" output="0"/>
    <key-map type="multiple-menu" input="2">
        <output>3</output>
        <output>4</output>
        <output>5</output>
    </key-map>
</profile>
```

In one embodiment, mapping application 120 enables the user to group people under a profile. For example, Lisa and Kulvir are SprintPCS users and Robby is with AT&T. To leave a person voicemail quickly, a user can press 1 for Sprint PCS. To leave a voicemail quickly for AT&T, the user may need to press another number to streamline into voicemail.

Figure 4:
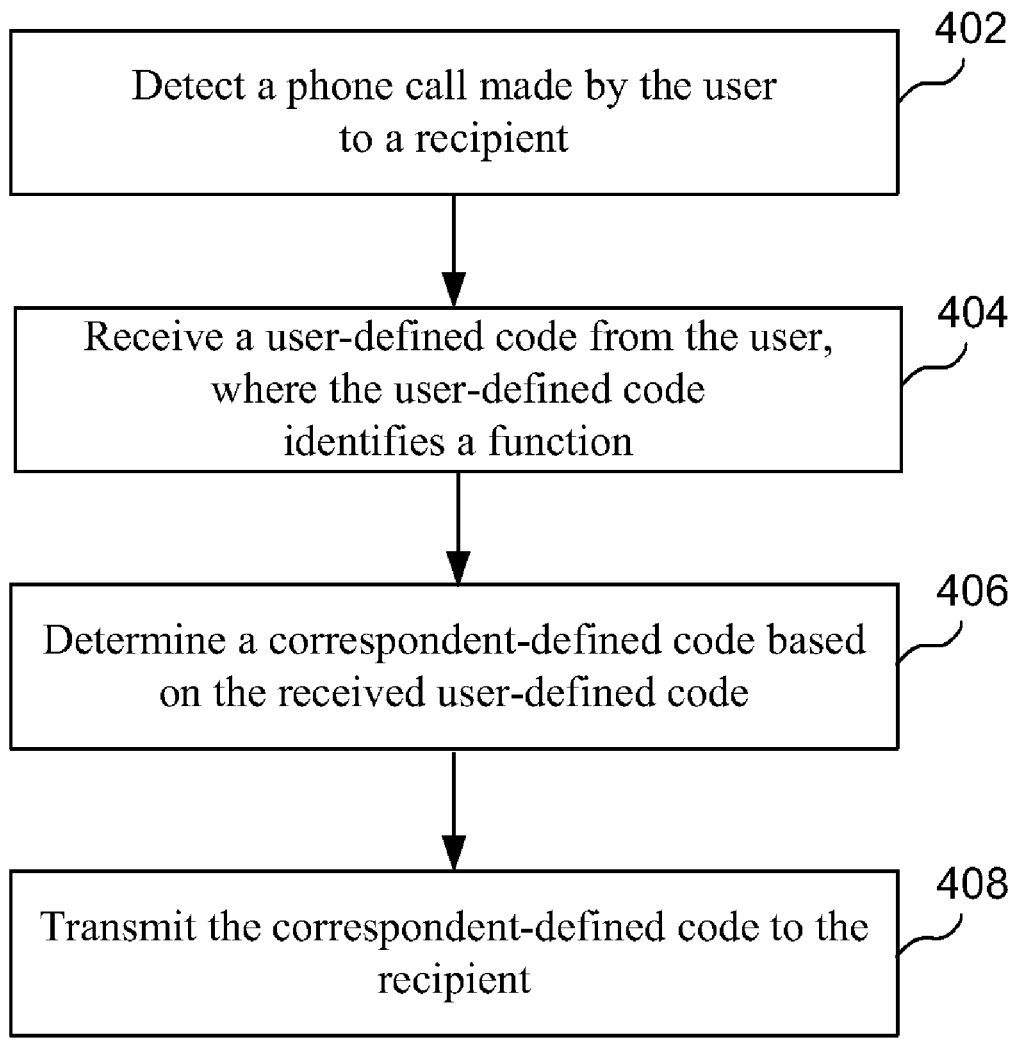
FIG. 4 is a flow chart showing a method for implementing a mapping of functions, correspondent-defined codes, and user-defined codes in accordance with one embodiment of the present invention.

FIG. 4 is a flow chart showing a method for implementing a mapping of functions, correspondent-defined codes, and user-defined codes in accordance with one embodiment of the present invention. Referring to FIGS. 1, 2, and 4 together, the process begins in step 402 where the mapping application 120 of the mapping system 106 detects a phone call made by the user to a correspondent. When interacting with the telephone menu, the user presses the appropriate user-defined code 206 into the telephone key pad to select a function. In one embodiment, the touch tone for the user-defined code 206 is suppressed on the caller's side. As such, the system on the correspondent side cannot hear the user-defined code 206. Next, in step 404, the mapping application 120 receives a user-defined code 206 from the user, where the user-defined code 206 identifies a function 202. Next, in step 406, the mapping application 120 determines a correspondent-defined code 204 based on the received user-defined code 206. In one embodiment, the mapping application 120 also identifies appropriate correspondent-defined code 204 based on the dialed telephone number, which corresponds to correspondent-defined code. The mapping application 120 makes this determination rather than dispatching the user-defined code 206 to the correspondent. Next, in step 408, the mapping application 120 transmits the correspondent-defined code 204 to the correspondent. In other words, the mapping application 120 translates user-defined code 206 into the appropriate correspondent-defined code 204. The correspondent does not hear the user-defined code 206, because it is suppressed. Instead, the correspondent hears the correspondent-defined code 204.

In an example applying steps 402-408, referring to FIG. 2, if the user dials Correspondent B (e.g., Cingular), the mapping application 120 automatically interprets the user's input of 1 as a voicemail request and transmits a *3 to Correspondent B. By utilizing the mapping, described above, to perform the interpretation, the mapping application 120 facilitates convenient user selections without any special menu interface. The user simply uses user-defined codes.

In one embodiment, the mapping application enables a user to download telephone menu options (functions) for different correspondents. For example, the user can download telephone menu options (correspondent-defined codes) for a telephone call placed with Correspondent A's (e.g., Bank of American's) 1-800 customer support number. The mapping application 120 can then map the user's options (user-defined codes) to the telephone menu option data (functions). For example, the user may define a rule such that when the user calls Correspondent A's 1-800 number, the user can 0 to transfer to a live customer service representative (CSR). If Correspondent A first requires that the user press *5 to be transferred to the CSR, the mapping application 120 translates the 0 into a *5.

According to the method and system disclosed herein, the present invention provides numerous benefits. For example, embodiments of the present invention facilitate user selection of telephone menu options. Embodiments of the present invention enable a user to more conveniently select telephone menu options during a telephone call, where the user may enter the same user-defined code in order to select a given function for different correspondents.

A method and system in accordance with the present invention for facilitating user selection of telephone menu options has been disclosed. The method includes receiving a set of functions that a user may select using corresponding correspondent-defined codes in a telephone menu during a telephone call to a correspondent. The method also includes receiving one or more user-defined codes, where a given user-defined code identifies a respective function. The method also includes generating a mapping of the at least one function, the correspondent-defined code, and the user-defined code.

The present invention has been described in accordance with the embodiments shown. One of ordinary skill in the art will readily recognize that there could be variations to the embodiments, and that any variations would be within the spirit and scope of the present invention. For example, embodiments of the present invention may be implemented using hardware, software, a computer-readable medium containing program instructions, or a combination thereof. Software written according to the present invention or results of the present invention may be stored in some form of computer-readable medium such as memory, hard drive, CD-ROM, DVD, or other media for subsequent purposes such as being executed or processed by a processor, being displayed to a user, etc. Also, software written according to the present invention or results of the present invention may be transmitted in a signal over a network. In some embodiments, a computer-readable medium may include a computer-readable signal that may be transmitted over a network. Accordingly, many modifications may be made by one of ordinary skill in the art without departing from the spirit and scope of the appended claims.

What is claimed is:

1. A method executed by a telephone system, comprising:
   receiving at least one function and a first correspondent-defined code for a first correspondent, wherein the first correspondent-defined code identifies the at least one function for the first correspondent in a first telephone menu;
   receiving a second correspondent-defined code for a second correspondent, wherein the second correspondent-defined code identifies the at least one function for the second correspondent in a second telephone menu;
   receiving a user-defined code, wherein the user-defined code identifies the at least one function in both the first and second telephone menus;
   generating a mapping of the at least one function, the first correspondent-defined code, the second correspondent-defined code, and the user-defined code; and
   periodically querying a resource for changes to the at least one function and changes to the first and second correspondent-defined codes.

2. The method of claim 1 further comprising storing the mapping in a database.

3. The method of claim 1 further comprising:
   receiving a first user-defined code from a user, wherein the first user-defined code identifies a first function;
   determining a correspondent-defined code based on the first received user-defined code; and
   transmitting the correspondent-defined code to the correspondent.

4. The method of claim 1 further comprising automatically updating the mapping to reflect changes to the functions and changes to the functions correspondent-defined codes.

5. The method of claim 1 further comprising creating a profile for a given correspondent, wherein the profile includes the mapping for the given correspondent.

6. A non-transitory computer-readable storage medium containing program instructions which when executed by a computer system cause the computer system to execute a method comprising:
   receiving at least one function and a first correspondent-defined code for a first correspondent, wherein the first correspondent-defined code identifies the at least one function for the first correspondent in a first telephone menu;
   receiving a second correspondent-defined code for a second correspondent, wherein the second correspondent-defined code identifies the at least one function for the second correspondent in a second telephone menu;
   receiving a user-defined code, wherein the user-defined code identifies the at least one function in both the first and second telephone menus;
   generating a mapping of the at least one function, the first correspondent-defined code, the second correspondent-defined code, and the user-defined code; and
   periodically querying a resource for changes to the at least one function and changes to the first and second correspondent-defined codes.

7. The computer-readable medium of claim 6 further comprising program instructions for storing the mapping in a database.

8. The computer-readable medium of claim 6 further comprising program instructions for:
   receiving a first user-defined code from a user, wherein the first user-defined code identifies a first function;
   determining a correspondent-defined code based on the first received user-defined code; and
   transmitting the correspondent-defined code to the correspondent.

9. The computer-readable medium of claim 6 further comprising program instructions for automatically updating the mapping to reflect changes to the functions and changes to the correspondent-defined codes.

10. The computer-readable medium of claim 6 further comprising program instructions for creating a profile for a given correspondent, wherein the profile includes the mapping for the given correspondent.

11. A telephone system comprising:
    a processor;
    a database coupled to the processor, wherein the processor is operative to:
    receive at least one function and a first correspondent-defined code for a first correspondent, wherein the first correspondent-defined code identifies the at least one function for the first correspondent in a first telephone menu;
    receive a second correspondent-defined code for a second correspondent, wherein the second correspondent-defined code identifies the at least one function for the second correspondent in a second telephone menu;
    receive a user-defined code, wherein the user-defined code identifies the at least one function in both the first and second telephone menus;
    generate a mapping of the at least one function, the first correspondent-defined code, the second correspondent-defined code, and the user-defined code; and
    periodically query a resource for changes to the at least one function and changes to the first and second correspondent-defined codes.

12. The system of claim 11 wherein the processor is further operative to:
    receive a first user-defined code from a user, wherein the first user-defined code identifies a first function;
    determine a correspondent-defined code based on the first received user-defined code; and
    transmit the correspondent-defined code to the correspondent.

* * * * *